Jan. 3, 1950 S. W. McKELLIP 2,493,635

AUTOMATIC SELECTOR MECHANISM

Filed Oct. 28, 1944 3 Sheets-Sheet 1

INVENTOR
SPENCER W. McKELLIP
by H. G. Grover
ATTORNEY.

Jan. 3, 1950 S. W. McKELLIP 2,493,635

AUTOMATIC SELECTOR MECHANISM

Filed Oct. 28, 1944 3 Sheets-Sheet 2

INVENTOR
SPENCER W. McKELLIP
by H. G. Grover
ATTORNEY.

AUTOMATIC SELECTOR MECHANISM

Filed Oct. 28, 1944 3 Sheets-Sheet 3

INVENTOR
SPENCER W. McKELLIP
By [signature]
ATTORNEY

Patented Jan. 3, 1950 2,493,635

UNITED STATES PATENT OFFICE 2,493,635

AUTOMATIC SELECTOR MECHANISM

Spencer W. McKellip, Wynnewood, Pa., assignor to Radio Corporation of America, a corporation of Delaware Application October 28, 1944, Serial No. 560,817

13 Claims. (Cl. 74—10.2)

My invention relates in general to an automatic selector mechanism, and more particularly to such mechanism which is adapted to effect the adjustment of variable elements of radio apparatus to predetermined or prearranged positions.

It is desirable in certain radio installations, as in two-way communication systems for aircraft, to effect adjustment of both the receiver and the transmitter, expeditiously and accurately, from one predetermined channel frequency to another, sometimes in accordance with a definite time schedule. Each adjustment of such equipment ordinarily involves the angular positioning of a plurality of rotary tuning condensers or other variable tuning elements, and if the equipment is operative in a plurality of bands, then also the actuation of a band selector switch, and in some instances a crystal selector switch.

Various automatic selector mechanisms have been devised, and some have been used with some success, for effecting the automatic adjustment of one or more variable elements, each to any selected one of a plurality of predetermined positions. Devices well known in the art require an individual control unit in association with each of the variable elements to be adjusted. Assuming, for example, that the equipment to be controlled is provided with a plurality of independently adjustable elements, such as a tuning condenser and a band selector switch, there is required in accordance with prior practice to provide each adjustable element with a separate control unit, although the several units which are similar may be actuated by a single motor.

In accordance with the present invention I have devised mechanism which utilizes a single control unit to effect the adjustment of a pair of adjustable elements in a single cycle of its operations thereby simplifying the construction, reducing the cost of production and reducing also the weight and size of the apparatus, factors which are important considerations in aircraft installations.

It is therefore an object of my invention to provide a selector mechanism of the type mentioned in which the control unit performs a double function thereby reducing in half the number of control units required in a particular installation.

A further object of my invention is to provide a dual purpose automatic selector device arranged for the independent adjustment of a pair of devices, one of which requires only an approximate or rough adjustment such as a multi-position contact switch, and the other of which requires a precise or accurate adjustment, such as a variable tuning condenser or inductor.

More specifically, it is an object of my invention to provide a motor-operated selector mechanism which is adapted to effect the automatic adjustment of a device to one of a plurality of predetermined positions and which is of the type having a cam assembly actuatable selectively to settings which correspond each to one of said predetermined positions, a selector disc assembly mechanically coupled to the device to be adjusted, a plurality of stop levers, a selected one of which is adapted, depending upon the setting of the cam assembly, to stop the selector assembly in one of the predetermined positions, and drive means for actuating the cam and selector assemblies in a predetermined sequence of operations, with a second selector disc assembly which is mechanically coupled to a second device to be adjusted, disposed in cooperative relation with said stop levers so as to be controlled by the same cam assembly and also arranged to be actuated by the same drive means.

Other objects and advantages of the invention will become apparent from the following description when read in conjunction with the accompanying drawings in which.

Figure 1:
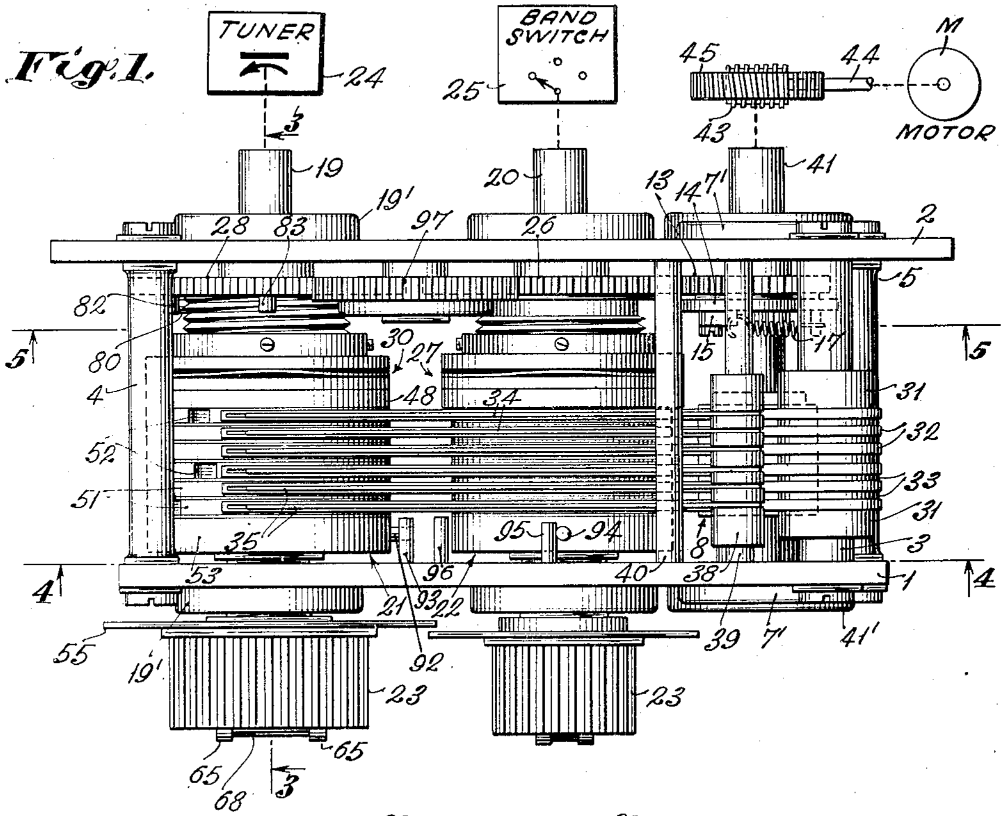
Fig. 1 is a plan view, on an enlarged scale, of the automatic selector mechanism in accordance with the invention.
Figure 2:
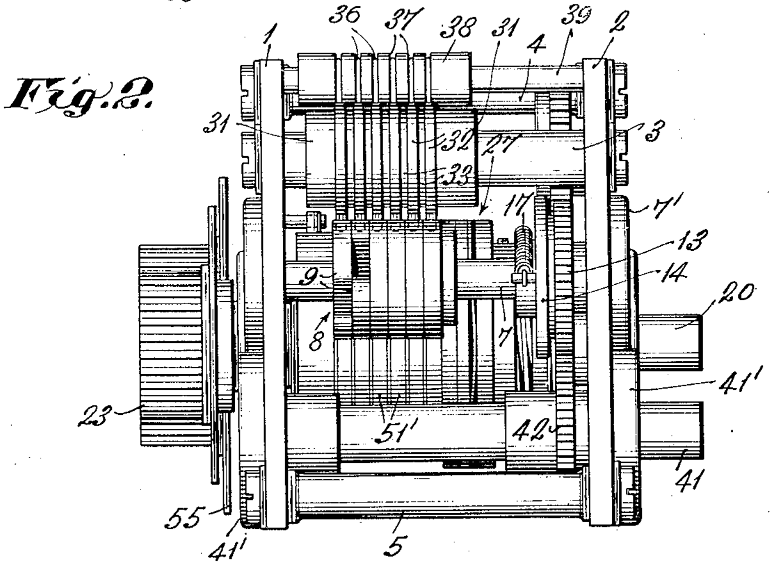
Fig. 2 is a side view of Fig. 1 looking from the right.

Referring to the drawings, and more particularly to Figs. 1 and 2, there is shown a single unit of the selector mechanism which consists of front and rear rectangular supporting plates 1 and 2, respectively, which are held in parallel spaced relation by four cross-rods 3 to 6, one in each corner. A cam shaft 7 extends between the plates at the right and is suitably journalled in bearings 7' therein. Shaft 7 carries at one end a cam disc assembly 8 which is fixed to the shaft and consists of a plurality of discs 9 (six in the present instance). Each cam disc has formed in its periphery a single notch 11, the several discs being so arranged in angular relation that the notches of successive discs are equi-angularly spaced and arranged in a spiral formation. Since six cam discs are utilized in the present embodiment the notches are spaced at 60° intervals. Freely mounted at the rear end of the cam shaft 7 is a gear 13 affixed to a disc member 14 which pivotally supports a pawl 15 disposed in cooperative relation with a ratchet member 16 (Fig. 5) mounted on the cam shaft and movable with the cam assembly. By means of a coil spring 17 (Figs. 1 and 5) the pawl is urged to ride on the periphery of member 16 which has formed thereon a single tooth 18. The parts 15 and 16 operate as a pawl and ratchet to actuate the cam assembly in one direction of rotation of the gear 13 (clockwise) but not in the opposite direction.

Also journalled within supporting plates 1 and 2 and arranged in parallel relation with cam shaft 7 are a pair of shafts 19 and 20 on which there are mounted selector disc assemblies 21 and 22, respectively, to be more fully described in connection with Fig. 3, it being sufficient for the present to state that each selector assembly, like the cam assembly, consists of 6 discs, with the discs of each assembly axially spaced along their respective shafts so that corresponding discs, one in each of the three assemblies, are aligned with one another. The forward end of each of the shafts 19 and 20 is provided with a manual control knob 23, and the rearwardly extending shaft ends are mechanically coupled by suitable means represented by the dash line, each to a rotatable device to be adjusted. For example, shaft 19 may be coupled to a variable tuning condenser represented diagrammatically at 24 while shaft 20 may be coupled to a band switch represented at 25. The disc assembly 22 is adapted to be driven from a gear 26 through a slip clutch 27 and the disc assembly 21 is adapted to be driven from a gear 28 through a similar slip clutch 30 and a pin-drive to be described later.

Pivotally mounted on the cross-rod 3 which is located at the upper right-hand corner, Fig. 1, and confined between a pair of collars 31 are six stop levers 32 separated by spacers 33. The several stop levers are disposed above the disc assemblies, extending in a direction transverse to their shafts, and each lever is aligned with a set of corresponding, aligned discs, one in each assembly. For the purpose of having the several stop levers 32 spring-pressed towards the discs of the assemblies, there are provided individual springs 34 which have their free ends 35 seated in grooves 35′ (Fig. 4) in the upper edges of the levers and their other ends 36 anchored in slots 37 in an elongated sleeve 38 which is keyed to a rod 39 supported between the front and rear plates. A second rod 40 spaced from rod 39 and also supported between said plates is arranged to overlie the springs and to be in contact therewith, so as to serve as a fulcrum for the springs.

Located below the cam shaft 7 and journalled in bearings 41′ and 41′ carried by the supporting plates 1 and 2 is a motor driven shaft 41 (Fig. 2) having affixed thereto a gear 42 which serves to drive the various elements of the selector unit. The shaft 41 is driven from an electric motor M, Fig. 1, through suitable reduction gearing, such as a worm 43 on the motor shaft 44 and a worm gear 45 on the shaft 41. Other selector units similar to that herein described may be driven from the motor shaft 44 through similar worm and gear sets.

Selector disc assembly 21 and the parts associated therewith are shown in cross-section in Fig. 3 to which reference will now be made. The shaft 19 is journalled in a ball-bearing 19′ in the front plate and in a second ball-bearing 19′ in the rear plate. The forward end of the shaft, just behind the front plate, is provided with an enlarged portion 46 forming a shoulder 47 with the main portion of the shaft, and between said shoulder and a plate 48 which is screw-threaded on an intermediate portion 48′ of the shaft there are disposed alternate spacers 49 and ring bushings 50. Plate 48 when tightened serves to clamp the several ring bushings and the spacers against the shoulder 47 so that they rotate with the shaft as a unit. Encircling each of the bushings and disposed between adjacent spacers is a selector disc 51 provided at one point in its periphery with a notch 52. The hub of plate 48 is formed as a bushing 55′ for receiving a disc 51 making a total of six selector discs as mentioned above. For the purpose of clamping the several discs together for rotation with shaft 19 there is provided a pressure plate 53 slidably mounted on the shaft portion 46 in an axial direction, so that by applying pressure to plate 53 the several discs may be clamped together at their rims between a rearwardly extending rim portion 54 of the pressure plate and the plate 48.

Figures 3, 4:
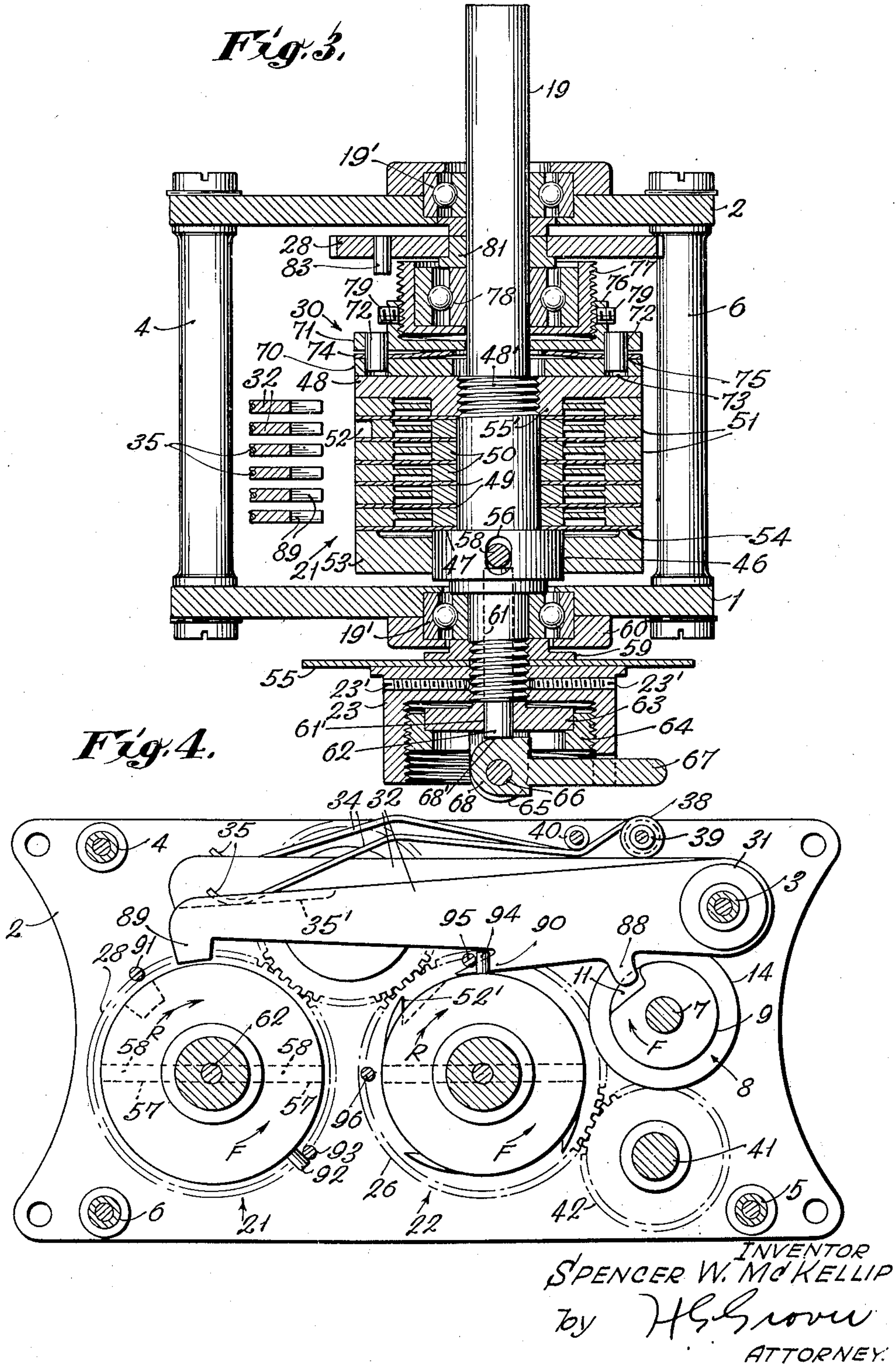
Fig. 3 is a view in cross-section, taken on the line 3—3 of Fig. 1, of the selector disc assembly which effects the precise adjustment.
Fig. 4 is a cross-sectional view taken on the line 4—4 of Fig. 1.

In order that pressure may be removed from the selector discs to permit of individual angular adjustment thereof, and also for applying pressure to the discs to condition the assembly for normal operation, the shaft portion 46 is provided with a transverse radial slot 56 which passes therethrough from one side to the other, and the pressure plate 53 is provided with a pair of radially aligned bores 57 (Fig. 4). A rod 58 extends through the slot in shaft portion 46, and its opposite ends are received in the bores of the pressure plate, a forced fit being provided between the rod and the bores. The pressure plate is thereby keyed to rotate with the shaft but by reason of the axial direction of the slot 56 the pressure plate is capable also of axial movement on shaft portion 46.

The forward end of shaft 19 extends through the front plate 1 and has a threaded portion for receiving a nut 59 which holds in position a retainer 60 for the front bearing 19′. The control knob 23, to the rear of which there is attached a dial plate 55, is threaded on the shaft and held in position by set screws 23′, and this end of the shaft is provided with a central bore 61 which extends into the slot 56 of shaft portion 46.

Within the bore 61 is fitted a rod 62 arranged for sliding movement. A member 63 has its hub in abutting relation with the end of shaft 19 and is formed with an aperture 61′ which is an extension of bore 61 to provide a further bearing for the rod 62. Member 63 is clamped in position by a ring nut 64 threaded within the front end of knob 23. The member 63 is provided with a pair of ears 65 (only one being shown in Fig. 3) between which there is supported a cross-pin 66 on which there is pivoted a lever 67. The pin 66 is off-center with respect to the hub 68 of lever 67 to provide a cam surface 68′ for effecting the necessary sliding movement of the rod 62. In the position of lever 67 shown in Fig. 3, which is the operative position, the rod 62 has been pushed rearwardly to exert pressure on plate 53 through the rod 58 which in turn causes the several discs 51 to be clamped together for rotation with shaft 19. In order to permit of individual adjustment of the selector discs, lever 67 is released by moving it in a clockwise direction, Fig. 3, through an arc sufficient to present the low side of cam surface 68' to the front end of rod 62. This allows the rod to move forwardly thereby removing the pressure theretofore exerted on pressure plate 53. Since the selector discs 51 are no longer clamped together, they may now be individually adjusted in a manner to be described later.

As heretofore mentioned disc assembly 21 and its shaft 19 are adapted to be rotated from the motor-driven gear 28 through a pin drive and a friction slip clutch. The slip clutch is shown generally at 30 in Fig. 3 and includes a friction plate 70 positioned next adjacent the end plate 48 of the disc assembly and mounted rotatably on shaft 19. Axially spaced from the friction plate is a circular plate 71 also loosely mounted on shaft 19 from the front face of which there extends a pair of pins 72, 72 disposed at diametrically opposite points adjacent to its periphery. The pins 72 extend into a pair of similarly disposed holes 73 formed in the friction plate 70, and a dished circular spring 74, interposed between plates 70 and 71, is also provided with a corresponding pair of holes 75 through which said pins are adapted to extend. Plate 71 is provided with a rearwardly extending, internally-threaded hub portion 76 which is adapted to be screwed onto a member 77 also rotatably mounted on the shaft 19. In order that friction between member 77 and shaft 19 may be reduced to a minimum there is interposed between them a ball-bearing 78. By rotating member 76 on member 77 in one direction or the other the pressure applied through spring 74 to friction plate 70, and therefore the friction between said plate and member 48, may be varied to a greater or less extent. Set-screws 79 serve to lock member 76 in its friction-adjusted position.

Carried by clutch member 77 is a radially extending pin 80, and extending from the front face of the gear 28 which is rotatably mounted on a bushing 81, are a pair of suitably spaced drive pins 82 and 83 (Fig. 5) which extend into the path of pin 80. The drive pins are so angularly spaced that upon rotation of the gear 28 in a counter-clockwise direction, as viewed in Figs. 3 and 5, pin 82 will coact with pin 80 to drive the disc assembly in the corresponding direction, and upon rotation of the gear in the reverse or clockwise direction, the second pin 83 after a lapse of a brief interval will coact with pin 80 to rotate the disc assembly in the reverse direction.

Except for the fact that discs 51' which constitute selector assembly 22 are provided with differently shaped peripheral notches 52' (Figs. 4 and 6), disc assembly 22 is similar to disc assembly 21. Also, the slip clutch 27 associated with assembly 22 is of similar construction to clutch 30 described above, and the manual control knobs 23 for both selector disc assemblies are similar.

In the view of Fig. 4, which is a cross-section taken along line 4—4 of Fig. 1, there is shown the relative disposition of the selector disc assemblies 21 and 22, the cam drum assembly 8 and the stop levers 32. The three assemblies are arranged side by side and the stop levers are of sufficient length to extend over all three. Each stop lever is provided with a cam follower 88, a locking portion 89 at its free end, and a second locking portion 90 disposed between parts 88 and 89. Cam follower 88 is adapted to ride on the periphery of a cam disc 9, being urged to that position by spring 34. Upon rotation of the cam assembly to a position such that the notch 11 of one of the cam discs arrives underneath follower 88, the lever 32 corresponding to said one cam disc will move about its pivot 3 in a counter-clockwise direction. This movement of the stop lever will cause the locking part 90 to ride on the corresponding disc 51' of assembly 22 until it drops into the disc notch 52', whereupon the lever will rock still further so that locking part 89 rides on the corresponding disc of assembly 21 until it drops into the disc notch 52. A complete cycle of operation for effecting adjustment of each selector disc assembly will be described later with reference to Figs. 6A and 6B.

Although it has been mentioned that shaft 19 associated with disc assembly 21 is mechanically coupled to a variable tuning condenser which requires a fine or accurate adjustment and that shaft 20 associated with disc assembly 22 is mechanically coupled to a rotary band switch which requires only a coarse adjustment, they are of course not limited to the specific elements mentioned. For example, shaft 19 may be utilized to control any element that requires a fine adjustment such as a variable inductor, and shaft 20 may be utilized to control any element that requires a rough adjustment such as any multi-position contact switch.

In the disclosed embodiment of the present invention the variable tuning condenser 24 under the control of selector disc assembly 21 is of the type that is adjustable through 180°. In order that this selector may be limited in its movement to this range, pressure plate 53 is provided on its periphery with a radial pin 92 which is adapted to coact with a pair of stop pins 91 and 93 (Fig. 4) which are spaced apart approximately 180° and extend rearwardly from front plate 1 into the path of pin 92. In the clockwise or "reverse" direction of rotation of assembly 21, from the position shown in Fig. 4, the variable condenser reaches its one limit of travel when pin 92 abuts stop pin 91, and in the counter-clockwise or "forward" direction of rotation the condenser reaches its other limit of travel when pin 92 engages stop pin 93, as shown.

Band switch 25 in the disclosed embodiment is of the type that is rotatable through not more than 280° and is adjustable to three positions. In order that selector 22 may be limited in its movement to this range, its pressure plate 53 is provided on its periphery with a radially extending pin 94 which is adapted to coact with a pair of stop pins 95 and 96 which extend rearwardly from front plate 1 and into the path of pin 94. In the illustrated device, pins 95 and 96 are spaced 280° apart so that in the clockwise direction of rotation of assembly 22 the band switch reaches its one limit of travel when pin 94 strikes stop pin 96, and in the counter-clockwise direction of rotation the switch reaches its other limit of travel when pin 94 strikes stop pin 95.

Figure 5:
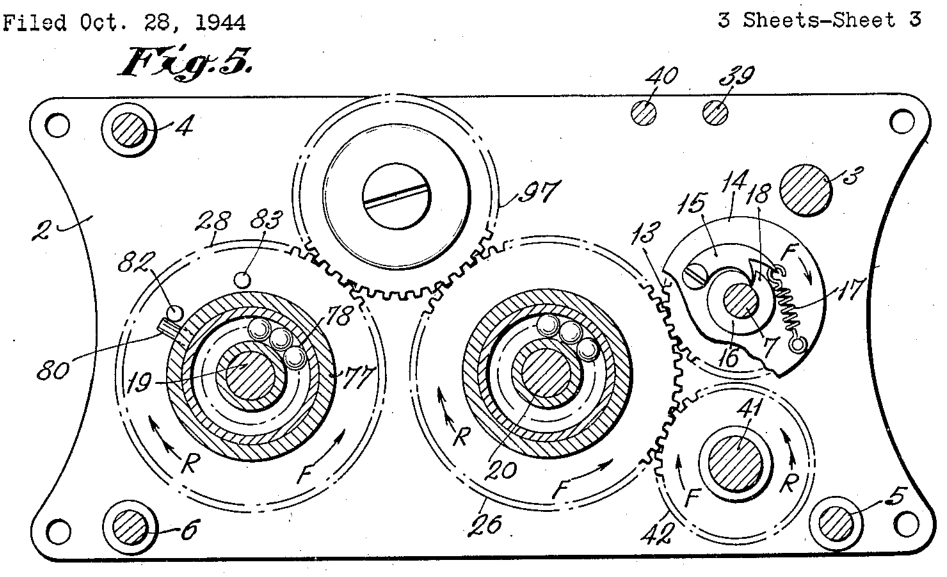
Fig. 5 is a cross-sectional view taken on the line 5—5 of Fig. 1.

In the view of Fig. 5, which is a cross-section taken along line 5—5 of Fig. 1, there is shown the gear drive for the several disc assemblies. Gear 42 on motor-driven shaft 41 is in mesh with gear 26 which in this case for driving disc assembly 22 is directly connected to clutch part 77. Gear 26 in turn is in mesh with gear 13 which drives the cam assembly 8 in only one direction through pawl 15 and ratchet 16. Gear 26 also drives gear 28 associated with assembly 21 through an idler 97 which is rotatably supported on the rear plate 2. The drive between gear 28 and disc assembly 21 has already been described. Inasmuch as gears 26, 28 are similar, that is have the same number of gear teeth, they both rotate at the same speed.

In order to effect operation of the several disc assemblies in the proper sequence, there may be employed in conjunction with the mechanism herein described a suitable electrical control system such as disclosed and claimed in an application of O. L. MacSorley, Ser. No. 560,816, filed concurrently herewith, now Patent No. 2,431,408, and assigned to the same assignee as the present application. The sequential operation of the several parts through a cycle during which the two rotatable elements are brought to the desired positions, will be described briefly in connection with Figs. 4, 5, 6A and 6B.

Figure 6A:
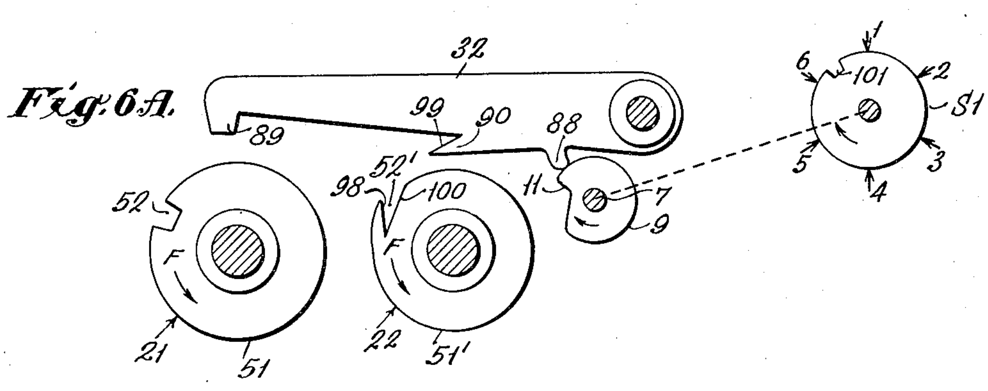
Fig. 6A shows in diagrammatic fashion a relative arrangement of the main parts of the mechanism which may exist at the beginning of a cycle of operations.
Figure 6B:
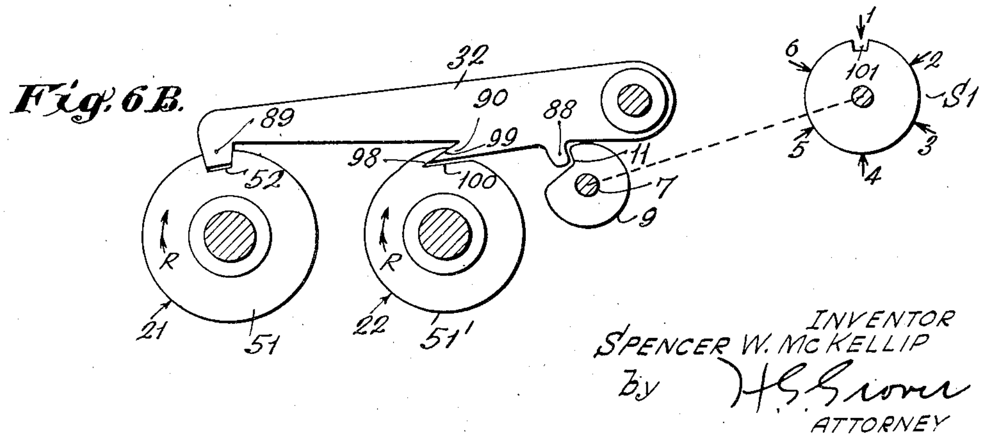
Fig. 6B is a similar view showing the arrangement of such parts at the end of a cycle of operations.

At 9, 51′ and 51 in Figs. 6A and 6B are shown, respectively, a cam disc, a selector disc for rough adjustment and a selector disc for fine adjustment. As explained above, these discs are aligned with each other and constitute a set of three corresponding discs, and they are aligned also with a stop lever 32 with which the latter is adapted to cooperate.

At the beginning of the cycle of operations, motor M which is of the reversible type is energized to rotate in that direction which hereinafter will be referred to as the "forward" direction. The motor rotates in this direction a sufficient number of revolutions to cause rotation, through gears 42, 26, 97 and 28 of selector discs 51′ and 51 in the forward direction (Fig. 6A) which is represented in the drawings by the arrows marked "F," each to one extreme end of its travel, which will be referred to as the "homing" position. For disc 51′ this limit of travel occurs when pin 94 strikes stop 95, and for disc 51 this limit of travel occurs when pin 92 strikes stop 93, Fig. 4. During this part of the cycle cam disc 9 is rotated in the forward direction through gears 42, 26, 13 and the pawl and ratchet 15 and 16. As explained in the above MacSorley application, the homing switch S1 rotates in synchronism with the cam assembly, so that upon arrival (following such previous rotation of the parts as will bring selector disc assemblies 21 and 22 to their homing positions) of the cut-out portion 101 of the homing switch underneath its selected contact 1 to 6 in the present instance, the cam disc corresponding thereto, which may be assumed to be the one shown in Figs. 6A and 6B, will be rotated to a position such that cam follower 88 of the stop lever drops into notch 11. As a consequence this stop lever 32, having been selected by the stopping position of the cam shaft, is rotated in a counterclockwise direction to cause its locking part 90 to ride on the periphery of selector disc 51′. The relative positions of the cam and selector assemblies at the end of the forward rotation are shown in Figs. 4 and 5, the selector assembly 21 having been driven to its homing position by engagement of pin 82 on gear 28 with pin 80 on the selector assembly.

After disc assemblies 21 and 22 have reached their homing positions as heretofore described, the driving motor is caused to reverse its direction of rotation, hereinafter referred to as the "reverse" direction, due to the operation of mechanism including homing switch S1, as described more fully in the aforesaid MacSorley patent.

This direction of rotation of the several elements is represented in the drawings by the double arrows marked "R." Since shaft 7 of the cam assembly is driven only by the pawl 15 and ratchet 16, cam disc 9 remains stationary when the motor is operated in the reverse direction.

In the reverse direction, the motor operates a sufficient number of revolutions to cause the immediate rotation of selector disc assembly 22, said rotation continuing until the locking part 90 of the selectively operated lever is engaged by the notch 52′ of the corresponding disc 51′. During the aforesaid rotation of the assembly 22 drive pin 82 on gear 28 has been backing away from the pin 80 affixed to assembly 21 and continus to do so until pin 83 coacts with pin 80 to thereby start rotation of assembly 21 in the reverse direction. The gearing for driving the disc assemblies and the relative spacing of drive pins 82 and 83 are such that adequate time elapses for effecting the locking engagement between a disc 51′ and its corresponding locking part 90 before the commencement of rotation of disc assembly 21.

At some point during the rotation of the discs in the reverse direction, the locking part 90 of the lever will drop into notch 52′ of disc 51′ a sufficient extent to allow locking part 89 to ride on the periphery of disc 51. Continued rotation of disc 51′ brings about a downward pull on the lever due to the application of a force on the upper edge 99 of locking part 90 by the disc part 98 which engages it. Locking part 89 is therefore caused to ride on the periphery of disc 51 under pressure, and until the notch 52 of disc 51 comes into registry with part 89 friction clutch 27 associated with disc 51′ will slip. Upon rotation of disc 51 to the point where part 89 drops into notch 52, a slight further rotation of disc 51′ is permitted which results in the application of additional pressure between disc part 98 and part 99 to force home the locking part 89 in notch 52. Simultaneously disc 51′ reaches its final adjusted position.

After completing its reverse rotation which assures interlocking of the selected lever 32 with its corresponding discs 51′ and 51 of selector disc assemblies 22 and 21 respectively, the motor is shut off by a limit switch, thus completing the cycle of operations.

Ordinarily, when the motor is thus cut off the pawl 15 is out of engagement with the tooth of ratchet 16. Accordingly, upon forward rotation of the motor at the beginning of an ensuing cycle of operations, there is some delay in operation of the cam shaft as the pawl 15 approaches the ratchet tooth. During this interval the portion 100 of the previously selected discs 51′ lifts the lever 32 sufficiently to free the lever part 89 from the notch 52 in disc 51. Disc 51 is not immediately driven because pin 82 has first to be moved into engagement with pin 80. Upon rotation of the cam shaft the lever 32 is further raised by its corresponding cam.

It will be clear from the foregoing that by reason of the construction and design of the stop lever, its locking part 90 and notch 52′ of disc 51′, the rotation of said disc to its position of final adjustment causes the simultaneous application of a force in a downward direction so that locking part 89 is forced into the notch of disc 51 in a positive manner.

As heretofore mentioned the same motor may be utilized to control other selector units. In such cases clutches 27 and 30 of each unit such as described above will slip until all selector units are driven to their predetermined adjusted positions, whereupon the motor will cease operation.

The procedure for initially setting up each pair of corresponding discs of the two selector assemblies is as follows, it being understood that in the first assembling the discs 51 of assembly 21 the several notches 52 will be contained within the operating range of 180° and likewise in first assembling discs 51' of assembly 22 the notches 52' will be contained within its operating range of 280°. The multi-position control switch, shown at RS in Fig. 2 of the MacSorley patent, which may be at a remote point is first set to any desired position, such as, for example, position 1. This initiates operation of the mechanism, and upon completion of the cycle as above described cam disc 9 corresponding to said switch position 1 will have been rotated so that its notch 11 is positioned to receive cam follower 88 of the corresponding stop lever, and the corresponding selector discs will have been rotated to their locked positions.

With the discs so locked, lever 67 associated with the manual control knob of each assembly is pulled out to thereby unclamp the disc stack of each assembly. Control knobs 23 are then manually rotated until the variable condenser and the band switch are set to their respective desired settings. The discs are then clamped together again by pushing in levers 67 to their first position. Thereafter, for position 1 of the control switch both selector disc assemblies will be actuated to the positions just set. The same procedure is followed for the other positions of the control switch.

In the presetting operation for a disc 51' of assembly 22 it might be necessary on some occasions to rotate control knob 23 in a counter-clockwise direction. In this instance it is important that springs 34 exert a sufficient downward force on their respective levers 32 to assure retaining discs 51 in their respective preset positions.

By reason of the fact that the discs of each assembly are mounted on the ring bushings 50 with sufficient friction, so that when unclamped at their peripheral rim portions which are separated by spacers or washers that are locked against rotation, the manual rotation during the setting-up operation of all the discs of the stack except the one that is held in locked position will not for any reason cause displacement of any other disc that may have been previously adjusted.

While I have shown and described a preferred embodiment of my invention, it will be understood that various modifications and changes will occur to those skilled in the art without departing from the spirit and scope of this invention. I therefore contemplate by the appended claims to include any such modifications as fall within the true spirit and scope of my invention.

What I claim is:

1. A motor-operated selector mechanism adapted to effect the automatic adjustment of a device to a selected one of a plurality of predetermined positions, comprising a cam assembly selectively actuatable to settings which correspond each to one of said predetermined positions, a selector disc assembly mechanically coupled to the device, a plurality of stop levers, a selected one of which depending upon the setting of the cam assembly is adapted to stop the selector assembly at the selected predetermined position, motor-driven means disposed between the cam assembly and the disc assembly and in cooperative relation with each selected stop lever to force the same to its stopping position, and drive means for actuating said lever cooperating means, the cam assembly and the selector assembly in a predetermined sequence of operations.

2. A motor-operated selector mechanism adapted to effect the automatic adjustment of a device to a selected one of a plurality of predetermined positions, comprising a cam assembly selectively actuatable to settings which correspond each to one of said predetermined positions, a selector disc assembly mechanically coupled to the device, a corresponding number of stop levers, means for moving the stop lever corresponding to the setting of the cam assembly to an intermediate position preparatory to stopping the selector assembly at a corresponding predetermined position, motor-driven means disposed between the cam assembly and the disc assembly constructed and arranged to engage the stop lever so moved for actuating the same to its home position whereat the selector disc assembly is stopped, and drive means for operating said stop lever actuating means, the cam assembly and the selector disc assembly in a predetermined sequence of operations.

3. A motor-operated selector mechanism adapted to effect the automatic adjustment of a device to a selected one of a plurality of peredetermined positions, comprising a cam assembly selectively actuatable to settings which correspond each to one of said predetermined positions, a selector disc assembly mechanically coupled to the device, a corresponding number of stop levers provided each with a disc-assembly stopping part and a part by which the lever is actuated to its stopping position during operation of the mechanism, motor-driven means disposed between the cam assembly and the disc assembly constructed and arranged to engage the lever-actuating part of the stop lever which happens to be effective for actuating the same to its home position whereat the selector disc assembly is stopped, and drive means for operating said stop-lever actuating means, the cam assembly and the selector disc assembly in a predetermined sequence of operations.

4. A motor-operated selector mechanism adapted to effect the automatic adjustment of a device to a selected one of a plurality of predetermined positions, comprising a cam assembly selectively actuatable to settings which correspond each to one of said predetermined positions, a selector disc assembly mechanically coupled to the device, a corresponding number of individually spring-pressed stop levers, means including a second disc assembly to permit under spring action movement of the stop lever corresponding to the setting of the cam assembly to an intermediate position preparatory to stopping the selector assembly at a corresponding predetermined position, means provided on said second disc assembly constructed and arranged to first engage the stop lever so moved and then to actuate the same to its home position whereat the selector disc assembly is stopped, and drive means for operating the cam assembly, the selector disc assembly and the second disc assembly in a predetermined sequence of operations.

5. A motor-operated selector mechanism adapted to effect the automatic adjustment of a pair of devices each to one of a plurality of predetermined positions, comprising a cam assembly actuatable selectively to settings which correspond each to one of said predetermined positions, first and second selector disc assemblies mechanically coupled each to one of the devices, a plurality of stop levers corresponding to the number of predetermined positions, the setting of the cam assembly determining the particular stop lever to be effective and with which a disc of each assembly is to cooperate for stopping each assembly at one of its predetermined positions, each stop lever being provided with a pair of stopping parts, one for cooperation with a notch in the disc of one assembly and the other for cooperation with a notch in the disc of the other assembly, one of the stopping-parts and its cooperating notch being constructed and arranged that, in addition to causing stopping of the associated disc assembly, they are effective to actuate the stop lever to cause the other stopping-part and notch to interlock and stop the other disc assembly, and drive means for operating the cam assembly and each selector disc assembly in a predetermined sequence of operations.

6. A motor-operated selector mechanism adapted to effect the automatic adjustment of a pair of devices each to one of a plurality of predetermined positions, comprising a cam assembly actuatable selectively to settings which correspond each to one of said predetermined positions, first and second selector disc assemblies mechanically coupled each to one of the devices, a plurality of stop levers corresponding to the number of predetermined positions provided each with a pair of disc-assembly stopping parts, one for each disc assembly, the discs of each assembly being provided each with a notch which is adapted to interlock with one of the lever-stopping parts, and drive means for operating the cam assembly and the two selector disc assemblies in a predetermined sequence of operations whereby for a particular setting to which the cam assembly is driven, the stopping parts of the lever then effective are instrumental in stopping first one and then the other disc assembly at their respective predetermined positions, the stopping part and disc notch effective when interlocked to stop the first disc assembly being constructed and arranged that said interlocking action applies a force to the stop lever to bring about interlocking between the stopping part and disc notch which are effective to stop the second disc assembly.

7. In a motor-operated selector mechanism adapted to effect the automatic adjustment of a device to one of a plurality of predetermined positions and of the type provided with a cam assembly selectively actuatable to settings which correspond each to one of said predetermined positions, a selector disc assembly mechanically coupled to the device to be adjusted, a plurality of stop levers, a selected one of which depending upon the setting of the cam assembly is adapted to stop the selector assembly in one of the predetermined positions, and drive means for actuating the cam and selector disc assemblies in a predetermined sequence of operations, the improvement in such selector mechanism which consists in providing a second selector disc assembly mechanically coupled to a second device to be adjusted, disposed in cooperative relation with said stop levers and arranged to be actuated in a predetermined sequence by the same drive means and at substantially the same speed of rotation as the first selector disc assembly.

8. In a motor-operated selector mechanism adapted to effect the automatic adjustment of a device to one of a plurality of predetermined positions and of the type provided with a cam assembly selectively actuatable to settings which correspond each to one of said predetermined positions, a selector disc assembly mechanically coupled to the device to be adjusted consisting of a plurality of discs each provided with a peripheral notch, the angular position of which determines the position to which the device is to be adjusted, a corresponding number of stop levers each provided with a stop portion, each stop lever depending upon the setting of the cam assembly adapted to have its stop portion engage the notch of the corresponding disc for stopping the selector assembly in one of said predetermined positions, and drive means for actuating the cam and selector assemblies in a predetermined sequence of operations, the improvement in such selector mechanism which consists in providing a second selector disc assembly mechanically coupled to a second device to be adjusted and consisting of a plurality of discs each provided with a peripheral notch, the angular position of which determines the position to which the second device is to be adjusted, said stop levers being provided each with a second stop portion arranged to be engaged by the peripheral notch of the corresponding dics of the second disc assembly, the latter being arranged to be actuated by the same drive means and at substantially the same speed of rotation as the first selector disc assembly and in a definite timed relation with the cam assembly and the first selector disc assembly.

9. In a motor-operated selector mechanism adapted to effect the automatic adjustment of a device to one of a plurality of predetermined positions and of the type provided with a cam assembly selectively actuatable to settings which correspond each to one of said predetermined positions, a selector disc assembly mechanically coupled to the device to be adjusted consisting of a plurality of discs each provided with a peripheral notch, the angular position of which determines the position to which the device is to be adjusted, a corresponding number of stop levers each pivoted at one end and provided at the other end with a stop portion, each stop lever depending upon the setting of the cam assembly adapted to have its stop portion engage the notch of the corresponding disc for stopping the selector assembly in one of said predetermined positions, and drive means for actuating the cam and selector assemblies in a predetermined sequence of operations, the improvement in such selector mechanism which consists in providing a second selector disc assembly mechanically coupled to a second device to be adjusted disposed between the first disc assembly and the pivoted ends of the stop levers, said second assembly consisting of a plurality of discs which are aligned with the discs of the first assembly and which are provided each with a peripheral notch, the angular position of which determines the position to which the second device is to be adjusted, said stop levers being provided each with a second stop portion intermediate its ends arranged to be engaged by the peripheral notch of the corresponding disc of the second disc assembly, the latter being arranged to be actuated by the same drive means and at substantially the same speed of rotation as the first selector disc assembly and in a definite timed relation with the cam assembly and the first selector disc assembly.

10. A motor-operated selector mechanism adapted to effect the automatic adjustment of a pair of devices each to one of a plurality of predetermined positions, comprising a cam assembly selectively actuatable to settings which correspond each to one of said predetermined positions, first and second selector disc assemblies each mechanically coupled to one of the devices to be adjusted, the discs of the first disc assembly being provided each with a peripheral notch which extends in a non-radial direction and is provided with an overhanging portion, the discs of the second disc assembly being provided each with a peripheral notch which extends in a radial direction, a plurality of stop levers each provided with a pair of locking parts shaped respectively to register with said radial and non-radial notches, each stop lever depending upon the setting of the cam assembly adapted to stop said disc assemblies each at one of its predetermined positions, and drive means including a reversible motor for actuating the cam and disc assemblies in a predetermined sequence of operations, characterized in that during the cycle of operation when the first selector disc assembly is rotated in one direction the non-radial notch of a disc of said assembly interlocks with its associated lever-locking part and the overhanging portion of said notch is effective during said interlocking action to drive home the other lever-locking part into a radial notch of the second disc selector assembly, and when said first selector disc assembly is rotated in the opposite direction the overhanging portion of the notch is withdrawn from its locked position and in doing so the opposite portion of said notch ejects the homed lever-locking part from the notch of the second disc assembly.

11. A selector mechanism is defined in claim 10 wherein the stop levers are pivoted at one end and the locking parts of each are provided at the opposite end and at a point intermediate said ends, and wherein the first disc assembly with the non-radial notches is positioned for cooperation with the intermediate locking part, and the second disc assembly with the radial notches is positioned for cooperation with the end locking part.

12. A motor-operated selector mechanism adapted to effect the automatic adjustment of a device to a selected one of a plurality of predetermined positions, comprising a cam assembly selectively actuatable to settings which correspond each to one of said predetermined positions, a selector disc assembly mechanically coupled to the device, a plurality of stop levers, a selected one of which, depending upon the setting of the cam assembly, is adapted to stop the disc assembly at the selected predetermined position, said stop levers each being pivoted at one end and provided with a disc-stopping part at the other end and further provided with a depending portion intermediate said ends, means for receiving the depending portion of any selectively actuated stop lever, said receiving means having a part which interlocks with the lever depending-portion to rock the lever about its pivoted end and to force the opposite end to its stopping position, and drive means for actuating said receiving means, the cam assembly and the disc assembly in a predetermined sequence of operations.

13. A selector mechanism as defined in claim 12 wherein said receiving means comprises a second disc assembly the discs of which are provided each with a notch which is adapted to interlock with the depending portion of a corresponding selectively-actuated stop lever.

SPENCER W. McKELLIP.

REFERENCES CITED

The following references are of record in the file of this patent:

UNITED STATES PATENTS

| Number | Name | Date |
|---|---|---|
| 2,285,414 | Collins | June 9, 1942 |
| 2,334,724 | Paessler | Nov. 23, 1943 |
| 2,378,941 | May | June 26, 1945 |
| 2,391,470 | May | Dec. 25, 1945 |